(No Model.)

A. W. ROBERTSON.
HORSESHOE.

No. 371,789. Patented Oct. 18, 1887.

Attest.
Geo. T. Smallwood
William H. Garner

Inventor,
Alexander W. Robertson
by L. Deane
his atty.

UNITED STATES PATENT OFFICE.

ALEXANDER W. ROBERTSON, OF DENTON, TEXAS.

HORSESHOE.

SPECIFICATION forming part of Letters Patent No. 371,789, dated October 18, 1887.

Application filed June 5, 1884. Serial No. 133,935. (No model.)

*To all whom it may concern:*

Be it known that I, ALEXANDER W. ROBERTSON, a citizen of the United States, residing at Denton, in the county of Denton and State of Texas, have invented certain new and useful Improvements in Horseshoes, of which the following is a specification, reference being had therein to the accompanying drawings.

Figure 1:
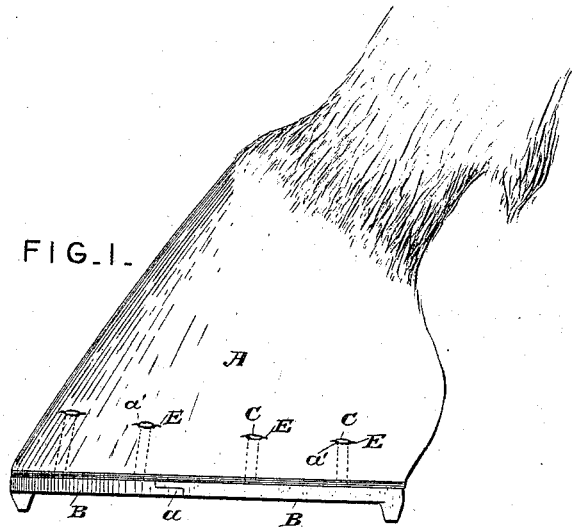
Figure 2:
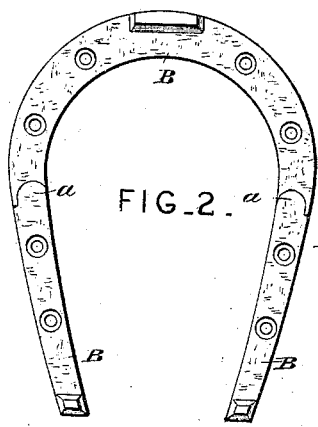
Figure 9:
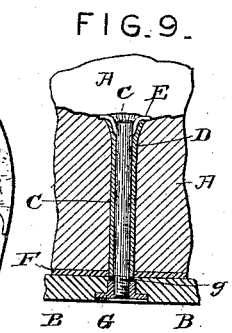
Figure 3:
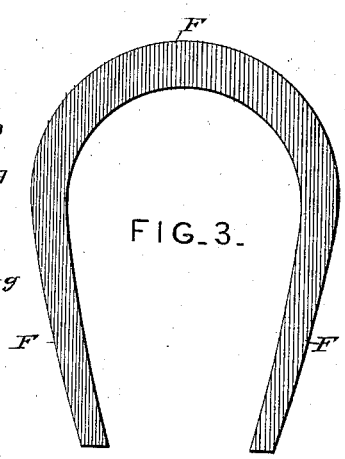
Figure 4:
Figure 5:
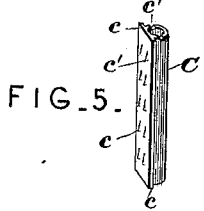
Figure 6:
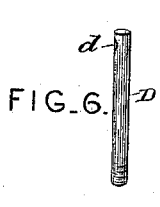
Figure 7:
Figure 8:

Figure 1 is a perspective view of a horse's hoof having my improvements applied to it. Fig. 2 is a bottom view of the shoe. Fig. 3 is a plan of the elastic cushion. Figs. 4, 5, 6, 7, and 8 are details of the fastening devices; Fig. 9, a detail in section showing fastening devices in position.

My invention relates to novel means of constructing horseshoes and securing them to horses' feet; and it has for its objects, first, to fasten a shoe to the hoof in such a manner that it will be firmly held in place, and in a great measure overcome the jar and concussion incident to traveling on hard roads; second, in so providing a fastening that the shoe can be secured to the hoof and removed at will without the aid of a skilled workman and without the use of nails, as will be fully understood from the following description, when taken in connection with the annexed drawings.

A designates a horse's hoof, and B a shoe, which is constructed of three sections connected together by rule-joints $a$ $a$, which flex inwardly, but not outwardly. Instead of making the shoe of three sections jointed together, I may have only one joint located at the toe part of the shoe, in which case the shoe will be composed of only two sections, and the side joints will be dispensed with.

C is a tapering tube of small diameter, which may be made round, square, or oval in cross-section, and which is constructed with flanges $c$ $c$, diametrically opposite each other. These flanges may or may not be provided with serrations or barbs $c'$, so that when the tube is set into the hoof the flanges will be in plane with the outside of the hoof, and the said barbs will be directed downward for the purpose of assisting in holding the tube securely in its place. The tube is preferably made of malleable iron.

D designates a bolt, which is made of spring-steel or of good wrought-iron, and which has a loop-eye, $d$, on one end and a screw-thread on the other end. This bolt is made to fit snugly in the tube C, and it is provided with a key, E, adapted to enter the loop or eye $d$.

F designates an india-rubber cushion or false shoe, made of the same size and shape as the shoe B and of any desired thickness, and perforated to correspond to the perforations through the shoe.

G designates a tap screwed on the lower end of the bolt D, and $g$ is a washer, which is applied on the bolt D before it is screwed on the tap G.

The manner of carrying out my invention is as follows: The horse's hoof is dressed level and the shoe fitted to it in the usual well-known manner, and then nailed on with the ordinary horseshoe-nails; but the nails are not clinched or driven up. The heads of the nails are then cut off, and the shoe is removed from the hoof. The tube C is then adjusted on the lower end of the nails in the hoof and driven into the same, being properly guided in its course by the nails until its upper end reaches the outer surface of the hoof. The nails are then withdrawn and the fragments of the hoof, if any, cleared out of the tube. The protruding upper ends of the tubes are then clinched over the hoof, and the lower end is filed off flush with the lower surface of the hoof.

If desired, the nails can be withdrawn from the hoof before inserting the tubes, and the holes then bored out to receive the tubes tightly. After the tubes are all in their places, the rubber cushion E is adjusted on the foot, the iron shoe is adjusted against it, the bolts D are inserted through the holes through the shoe, the cushions, and the tubes C until the ends of said bolts protrude beyond the upper ends of the tubes. The key E is now passed through the eye $d$ in the bolt, and its ends are partially sunk in grooves $a'$, previously made in the hoof, so as to come on opposite sides of the tube. The key E also rests in the indentations $c'$ in the flanged upper end of the tube, which come in conjunction with the groove $a'$. The washer $g$ is then adjusted over the screw-threaded end of each bolt, and the tap G is put on this end and screwed home.

The key E is made of a piece of round wire flattened on the side which lies next to the hoof, and constructed with a knuckle, $e$, at the middle of its length, into which the loop or eye on the end of the bolt strikes.

Having described my invention, I claim as new—

1. The combination of the tube flanged at its side and upper end, the horseshoe, and the bolt in said tube, with the tap and key fastenings, all as described.

2. The combination of the horseshoe B, the rubber F, the tube C, flanged at its sides and upper end, the bolt D, having hole $d$, the bent key E, and tap G, the whole constructed in the manner and for the purposes set forth.

In testimony whereof I affix my signature in presence of two witnesses.

ALEXANDER W. ROBERTSON.

Witnesses:
 MATT DAUGHERTY,
 JOHN L. RUDDELL.